Aug. 13, 1968 G. M. RAPTIS 3,396,996
SELF-SEALING BOLT ASSEMBLY
Filed Jan. 12, 1967 2 Sheets-Sheet 1
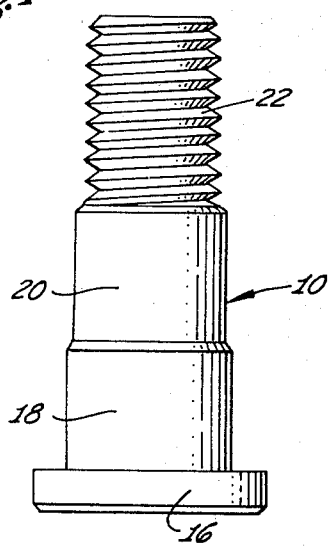
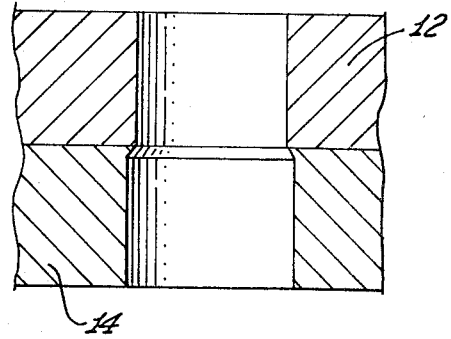
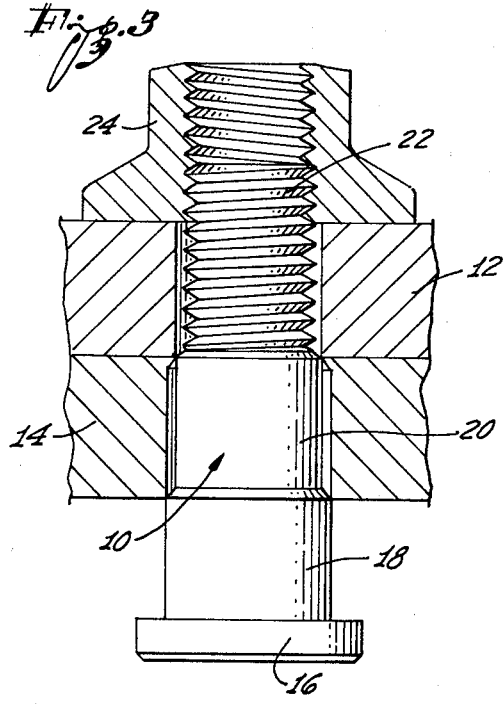
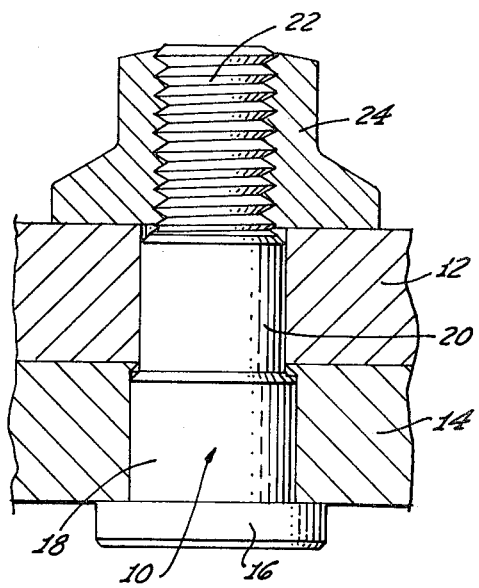
INVENTOR:
George M. Raptis
By Keith D. Beecher
ATTORNEY

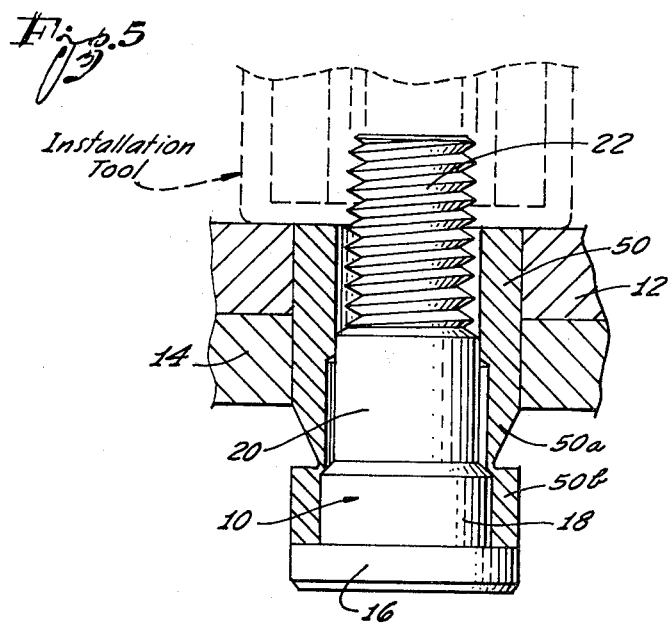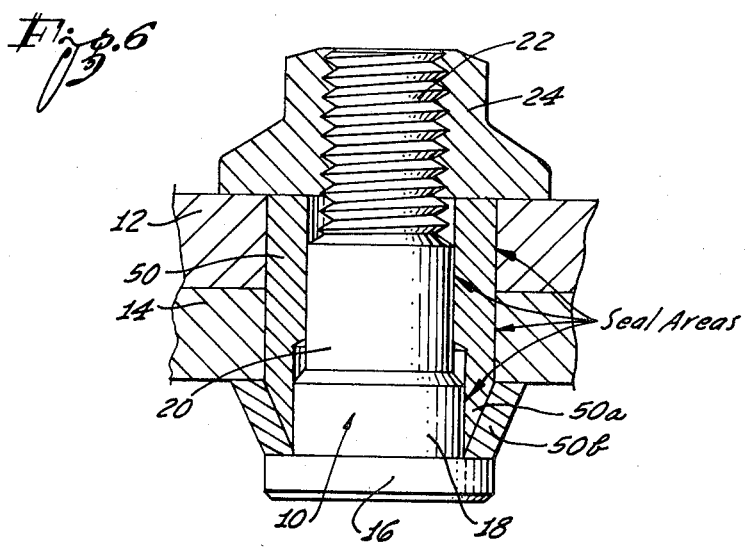

United States Patent Office 3,396,996
Patented Aug. 13, 1968

3,396,996
SELF-SEALING BOLT ASSEMBLY
George M. Raptis, Pacific Palisades, Calif., assignor to Leona H. Dounis, Pacific Palisades, Calif.
Filed Jan. 12, 1967, Ser. No. 608,835
2 Claims. (Cl. 287—189.36)

ABSTRACT OF THE DISCLOSURE

An improved self-sealing fastener assembly is provided, in which a bolt is drawn into aligned holes in adjacent plates into a self-sealing fastening engagement therewith, this being achieved by providing a stepped diameter on the shank of the bolt, and without the need for tapered holes or a tapered bolt.

---

The present invention relates generally to fasteners, and it realtes more particularly to an improved self-sealing bolt assembly.

An object of the invention is to provide an improved self-sealing bolt assembly which is capable of producing an effective seal along the length of the bolt for the plates fastened thereby, and to achieve such a seal without the need for tapered components, tapered holes or the like.

Another object of the invention is to provide such an improved self-sealing bolt assembly which is capable of providing an effective seal; and which may be composed, for example, of corrosion resitsant steel to be capable of withstanding high temperatures and to be relatively immune from attack by corrosive fluids.

Another object of the invention is to provide such an improved self-sealing bolt assembly which may be constructed relatively inexpensively since it does not entail tapered parts; and which may be installed easily and inexpensively since it does not require tapered holes.

SUMMARY OF THE INVENTION

The invention provides an improved combination, whereby two or more plates having aligned holes of unequal diameter are fastened together by a self-sealing bolt, the bolt having a smooth gripping shank portion adjacent the head thereof. The gripping shank portion of the bolt has axially adjacent sections of different diameters and of diameters related to the diameters of the holes, such that when the bolt is drawn into the holes and fastened into place, it forms an effective self-sealing fastener.

Other objects and advantages of the invention will become apparent from a consideration of the following description, when the description is taken in conjunction with the accompanying drawings, in which:

FIGURE 1 is a side elevation of a self-sealing bolt, constructed in accordance with the concepts of the invention, and representing one embodiment of the invention;

FIGURE 2 is a side section of a pair of plates having aligned holes therein, and whtich are capable of being fastened together and sealed by the bolt of FIGURE 1;

FIGURE 3 shows the bolt of FIGURE 1 in the process of being drawn into the holes in the plates of FIGURE 2, by means of a nut which is threaded to the bolt;

FIGURE 4 shows the bolt and nut assembly of FIGURE 3 in a mounted sealing position wtih respect to the plates to be fastened thereby; and FIGURES 5 and 6 show an assembly, like the assembly of FIGURES 1–4, but incorporating an additional sleeve component, so as to be mountable from one side of the plates, as a blind fastener, FIGURE 5 showing the assembly in a partially assembled condition, and FIGURE 6 showing the assembly in a completely assembled condition.

The bolt designated generally as 10 in FIGURE 1 is intended to fasten together a pair of plates 12 and 14 shown in FIGURE 2. The plates 12 and 14 have a pair of aligned holes, as shown in FIGURE 2, which are intended to receive the bolt 10. It will be observed that the diameter of the hole in the plate 12 is slightly smaller than the diameter of the hole in the plate 14.

The bolt 10 has a head 16, and it has a smooth gripping portion which, in the illustrated embodiment, is made up of the sections 18 and 20. The section 18 is adjacent the head 16, and it has a length corresponding to the thickness of the plate 14. Moreover, the outer diameter of the section 18 is slightly larger than the diameter of the hole in the plate 14.

Likewise, the section 20, which is interposed between the section 18 and a threaded portion 22, has a length which is less than the thickness of the plate 12, and it has an outer diameter which is slightly larger than the diameter of the hole in the palte 12. The threaded portion 22 extends along the bolt 10 from the section 20 to the end of the bolt remote from the head 16.

In the practice of the invention, the plates 12 and 14 may be drilled, so that a straight sided aligned pair of holes is provided in the two plates. Then the hole in the sheet 14 may be reamed so that its diameter is slightly greater than the diameter of the hole in the plate 12, as shown in FIGURE 2.

Then, as shown in FIGURE 3, for example, the bolt 10 is inserted in the holes in the plates 12 and 14, so that its threaded portion 22 extends through the plates and protrudes from the side of the plate remote from the head 16. The bolt is made long enough so that, for example, four threads of the threaded portion protrude beyond the plate 12 in the position of FIGURE 3. This is in order that the bolt may be drawn into the holes by the nut. Of course, the bolt may be driven into the holes by other means, and the nut merely tightened in place.

A nut 24 is then threaded onto the protruding end of the threaded portion 22, as shown in FIGURE 3. Then, as the nut is tightened, the bolt 10 is drawn into the holes into the position shown in FIGURE 4. The section 20, being slightly larger than the hole in the plate 12, is drawn into that hole in such a relationship that the shank of the bolt 10 engages the bore of the hole in the plate 12 in a tight sealing relationship. At the same time, the section 18, which is slightly larger than the diameter of the hole in the plate 14 is drawn into the latter hole, and engages the bore of that hole in a tight sealing relationship, this being shown in FIGURE 4.

It will be appreciated that in order to assure a tight clasping relationship of the bolt assembly with respect to the plates 12 and 14, the length of the gripping section 20 should be slightly less than the thickness of the plate 12, so that at least some of the threaded portion 22 extends down into the hole in the plate 12, as best shown in FIGURE 4, when the bolt assembly is tightened in place.

As also shown, the leading edges of the sections 20 and 18 of the bolt 10, and the edge between the holes in the plates 12 and 14, may be beveled to facilitate the insertion of the sealing bolt in the holes.

An appropriate wrench-receiving means may be provided at the head of the bolt, or in the upper end of the bolt, to permit the bolt to be held against rotation, as the nut 24 is being tightened into place. It has been found that there is little tendency for the bolt to rotate as the nut is being tightened.

It will also be appreciated that when the plates 12 and 14 are relatively thin, a single section may replace the stepped sections 18 and 20, with the holes in the two plates being of the same diameter, and with the single section being of an outer diameter slightly larger than the diameter of the holes.

By the same token, when the plates 12 and 14 are relatively thick, the stepped sections 18 and 20 may be increased to three or more distinct stepped sections, with the holes in the plates 12 and 14 being correspondingly stepped.

Of course, any form of head 16 may be used, such as an hexagonal head, a flush type head, or a head having appropriate grooves for receiving a screw driver, Allen wrench, Phillips type screw driver, or the like.

In a constructed embodiment of the invention, the outer diameter of the section 18 was made .005 inch greater than the diameter of the hole in the sheet 14, and the outer diameter of the section 20 was made .005 inch greater than the diameter of the hole in the sheet 12.

Likewise, both the sections 18 and 20, in the constructed embodiment, were made so that the section 18 would have a length .03 inch less than the thickness of the sheet 14, and the section 20 would have a length .03 inch less than the thickness of the plate 12, so that, as shown in FIGURE 4, the threaded portion 22 would extend down into the hole in the plate 12 an appropriate distance to assure a positive and tight clamping action of the bolt assembly.

The embodiment shown in FIGURES 5 and 6 is generally similar to that described above, and like components have been represented by the same numbers.

In the latter embodiment, the holes in the plates 12 and 14 are defined by a sleeve 50. The sleeve 50 has a wedge-shaped groove 50a formed near its lower end and it also has an integral end portion 50b. The sleeve 50 is similar to the sleeve described in copending application 492,233, filed in the name of the present inventor, October 1, 1965. However, the sleeve 50 in the present assembly does not include an external or internal taper.

Rather, the holes in the plates 12 and 14 are drilled with straight sides, and the sleeve 50 fits into the holes, as shown in FIGURE 5. The inner diameter of the sleeve 50 is stepped and dimensioned so as to receive the sections 18 and 20 of the bolt 10, and to have slightly smaller respective diameters than the diameters of the corresponding sections of the bolt, in accordance with the concepts described above.

In the practice of the invention, the sleeve 50 should contain one more internal step than the step of the corresponding bolt. In the embodiment under consideration, and since the bolt 10 has two steps, the sleeve 50 has three internal steps, as shown.

The assembly of FIGURES 5 and 6 constitutes a blind fastener, in that the entire fastener can be inserted into the plates 12 and 14 and tightened in place from one side of the sheets, in a manner similar to that described in conjunction with the assembly of the copending application. Alternately, a special tool can be used to insert the fastener and tighten it in place, after which the nut 24 can be screwed on.

That is, the sleeve 50 and the bolt 10 are slipped into the holes in the plates 12 and 14 from the upper side of the plate 12, and tightened. The nut 24 is then threaded to the upper end of the bolt, as shown.

As the bolt 10 is drawn up into the sleeve 50 by the special tool, or other means, it engages the inner surface of the sleeve 50 and causes the sleeve 50 to expand radially outwardly against the sides of the holes in the plates 12 and 14.

As shown in FIGURE 6, as the bolt 10 is drawn up into the sleeve, the end of the wedge-shaped groove 50a fractures and moves down between the section 18 of the bolt and the end portion 50b. The effect is that the portion 50b is drawn up over the end of the wedge-shaped groove 50a, so that the upper end of the portion 50b is deflected radially outwardly, as shown in FIGURE 6. It will be appreciated that the action described is essentially similar to that described in conjunction with the blind fastener of the aforesaid copending application.

As described above, an important feature of the fastener of the present invention is that full, complete and adequate sealing is provided by the fastener, without the need for tapered holes in the workpieces, or tapered bolts or sleeves.

The fastener assembly of the invention is capable of providing full and positive sealing between the plates 12 and 14, and since it does not involve O-rings or other equivalent parts, is capable of withstanding high temperatures and corrosive attack without failure.

While particular embodiments of the invention have been shown and described, modifications may be made. It is intended in the claims to cover all modifications which come within the scope of the invention.

What is claimed is:

1. An assembly including first and second plates of material of a predetermined overall thickness and having aligned holes; the hole in the first plate having a slightly larger diameter than the hole in the second plate; a bolt having a head at one end, said bolt having a shank of a length greater than said predetermined overall thickness of said plates, and further having a smooth gripping portion extending along the length of said shank from said head a distance no greater than said predetermined overall thickness of the first and second plates, and said bolt having a threaded portion of a diameter less than the diameters of the holes in said first and second plates extending the remaining length of said shank from said smooth gripping portion to the end of said shank remote from said head, said smooth gripping portion of said bolt having a first cylindrical section adjacent said head with an outer diameter slightly larger than the diameter of the hole in the first plate, and a second cylindrical section between said first section and said threaded portion having an outer diameter less than the diameter of the hole in the first plate and slightly larger than the diameter of the hole in the second plate, said first cylindrical section of said gripping portion having a length substantially corresponding to the thickness of said first plate, and said second cylindrical section having a length substantially corresponding to the thickness of said second plate, said first and second cylindrical sections being joined to each other by a first frusto-conical section, and said second cylindrical section being joined to said threaded portion by a second frusto-conical section, a nut threaded on said threaded portion for drawing said gripping portion of said bolt into said holes in sealing relationship with the plates.

2. The assembly defined in claim 1 in which said holes in said first and second plates are defined by a sleeve member extending through said plate.

References Cited
UNITED STATES PATENTS

| | | | |
|---|---|---|---|
| 909,118 | 1/1909 | Richards et al. | 85—1 |
| 2,895,367 | 7/1959 | Nagy | 85—1 |
| 3,112,599 | 12/1963 | Brewer | 85—1 |
| 3,129,630 | 4/1964 | Wing et al. | 85—72 |
| 3,262,353 | 7/1966 | Waeltz et al. | 85—72 |
| 3,270,410 | 9/1966 | Salter et al. | 287—189.36 |

CARL W. TOMLIN, *Primary Examiner.*

RAMON S. BRITTS, *Assistant Examiner.*